Jan. 27, 1959 R. C. STEELE ET AL 2,870,693
PULLING MEANS FOR EXPANDING HONEYCOMB
Filed July 26, 1955 8 Sheets-Sheet 4
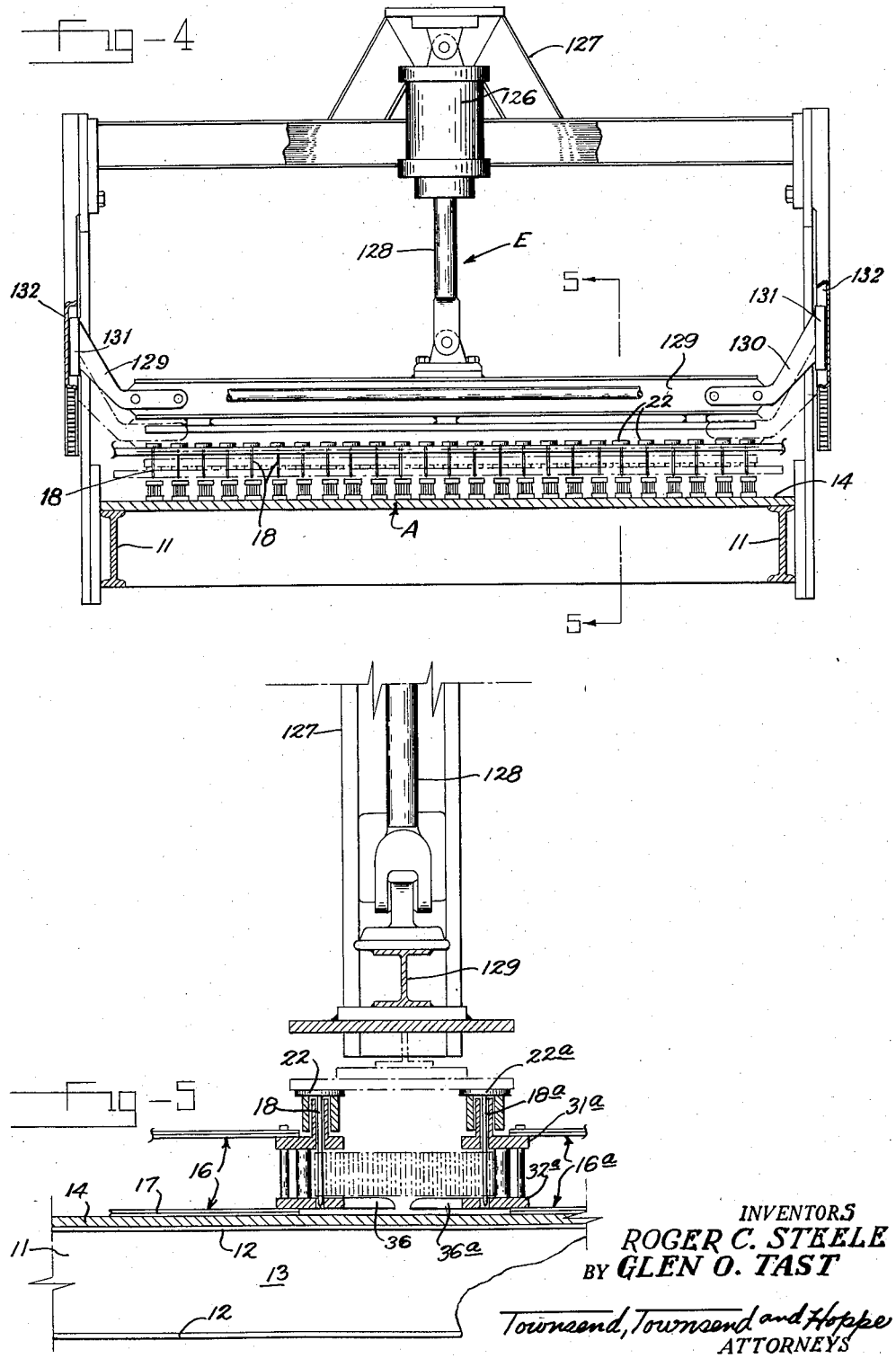
INVENTORS
ROGER C. STEELE
BY GLEN O. TAST
Townsend, Townsend and Hoppe
ATTORNEYS

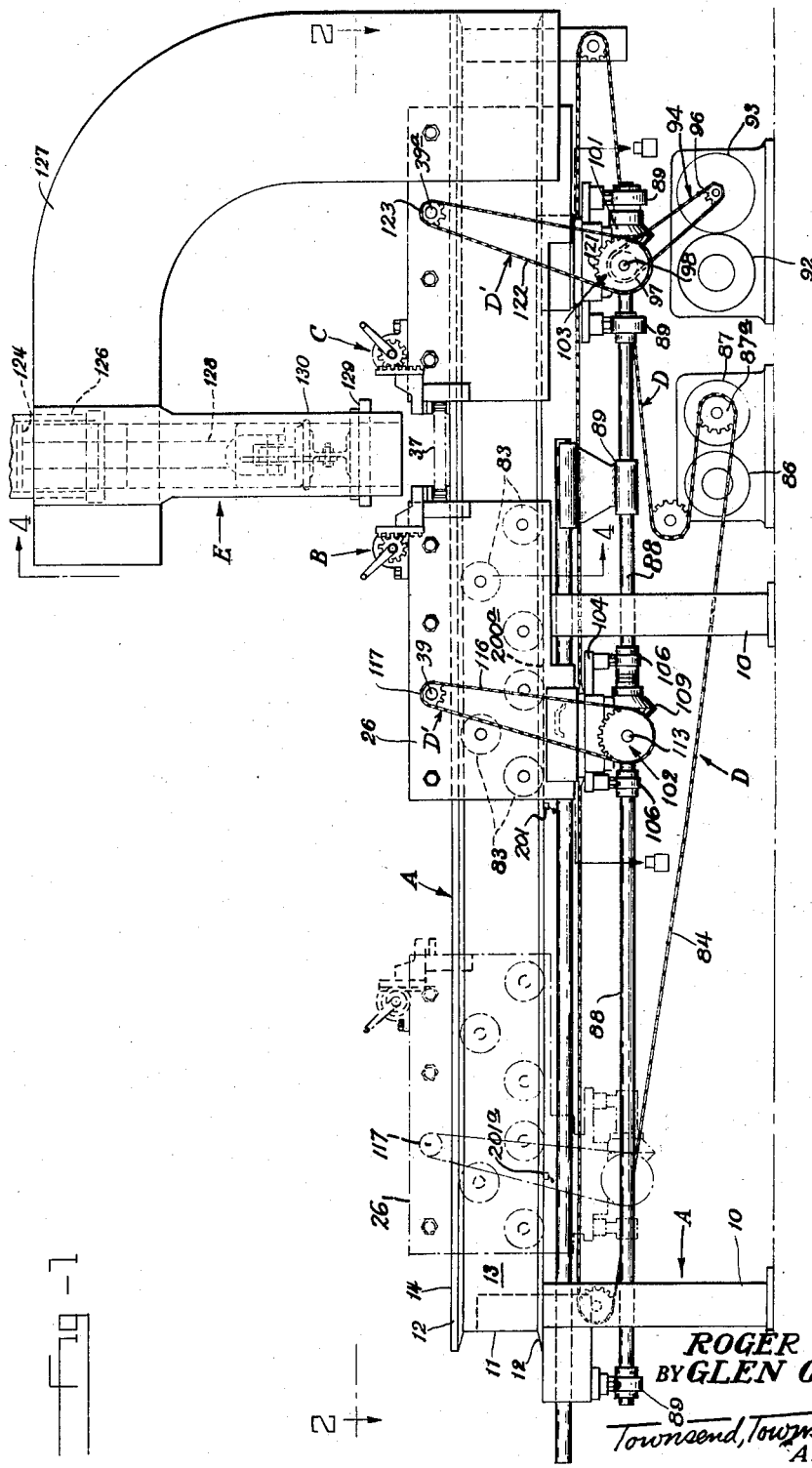

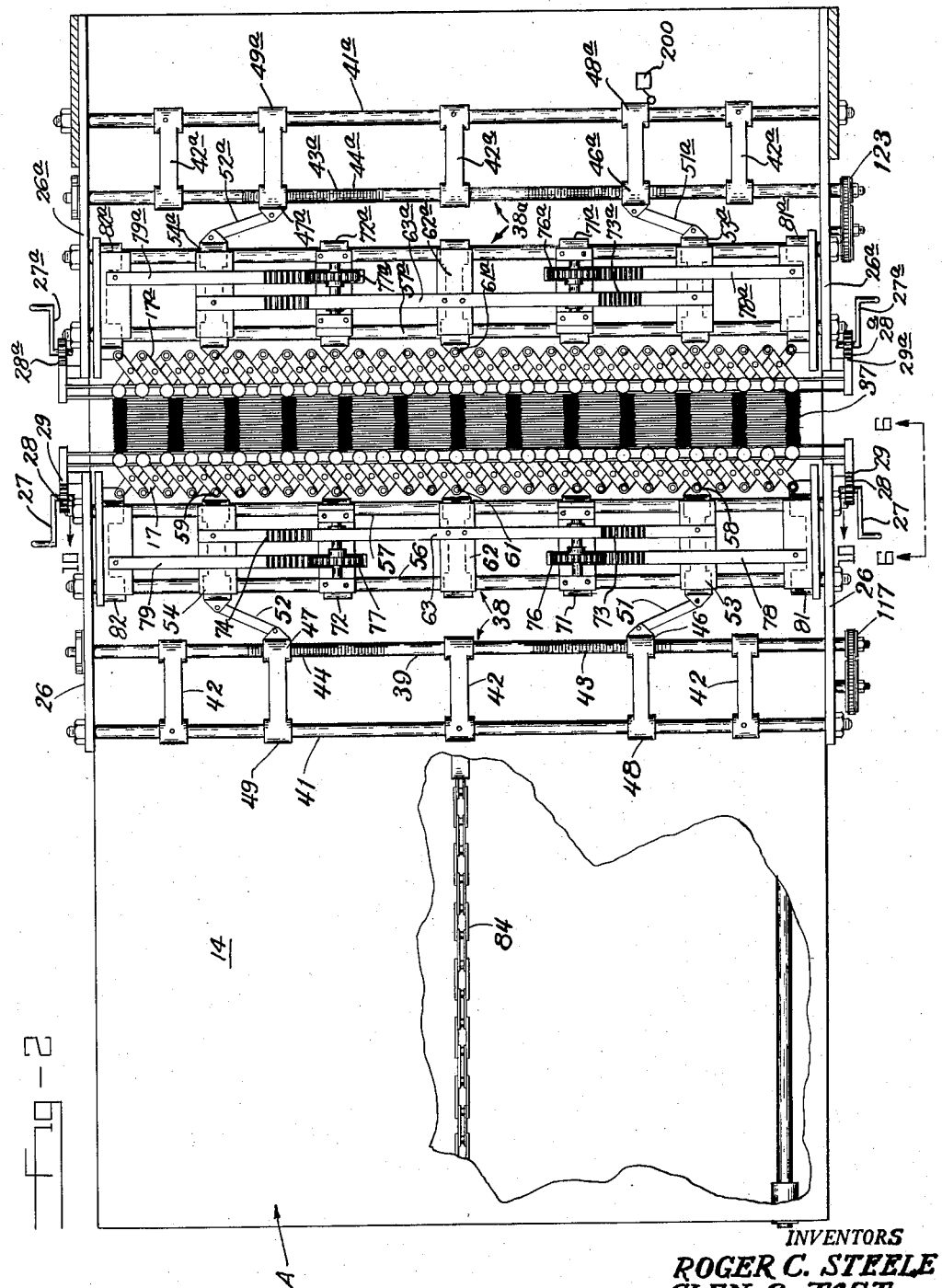

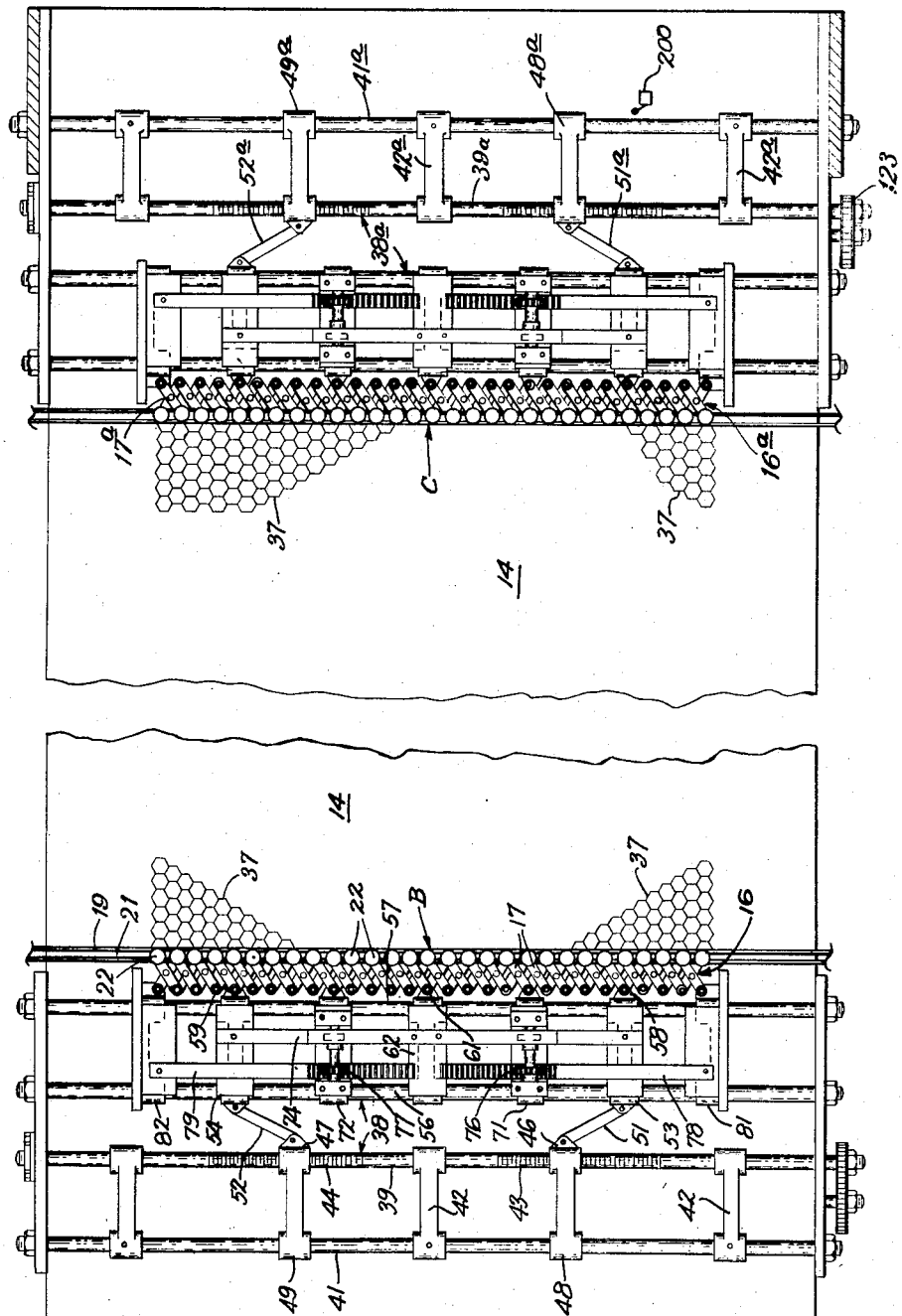

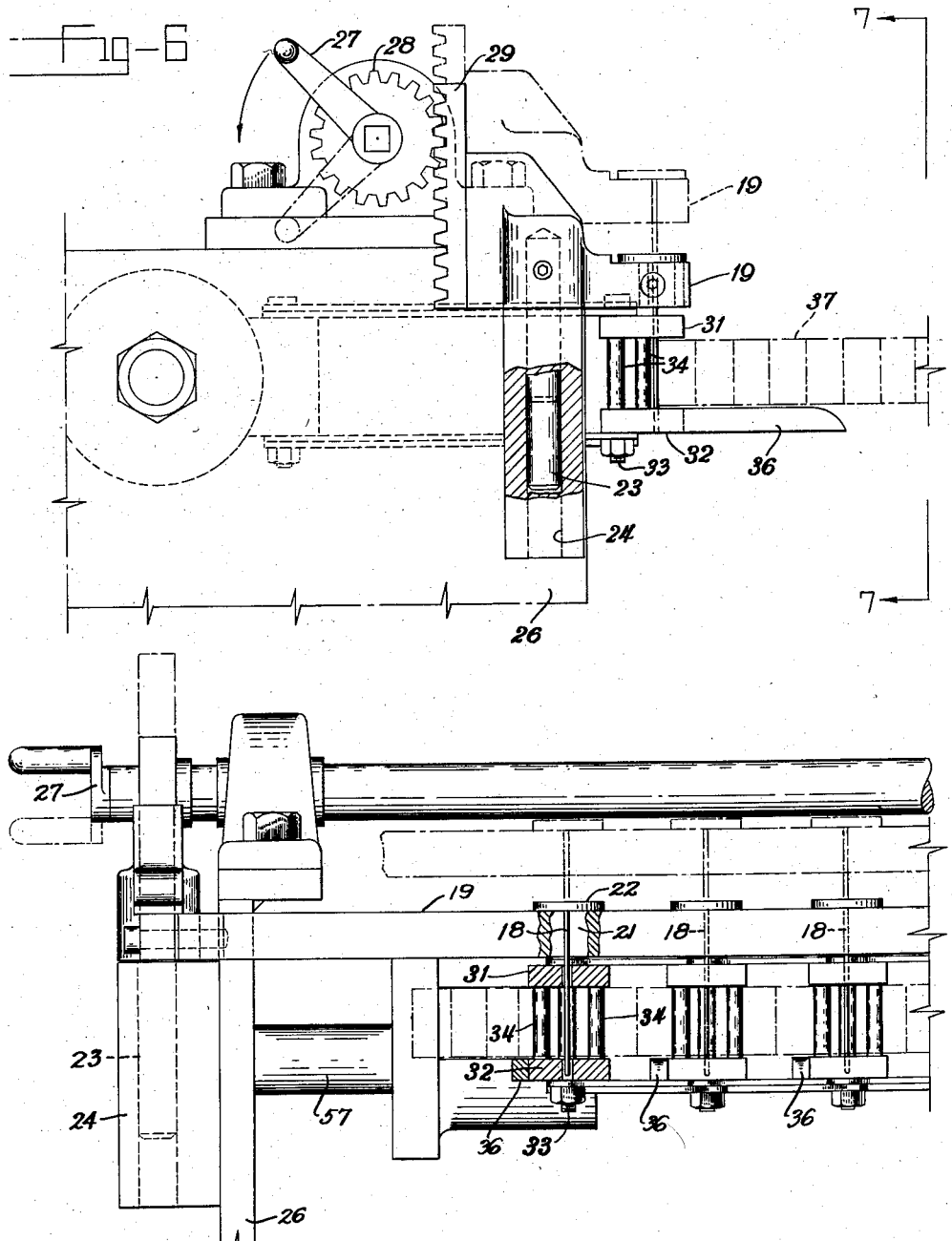

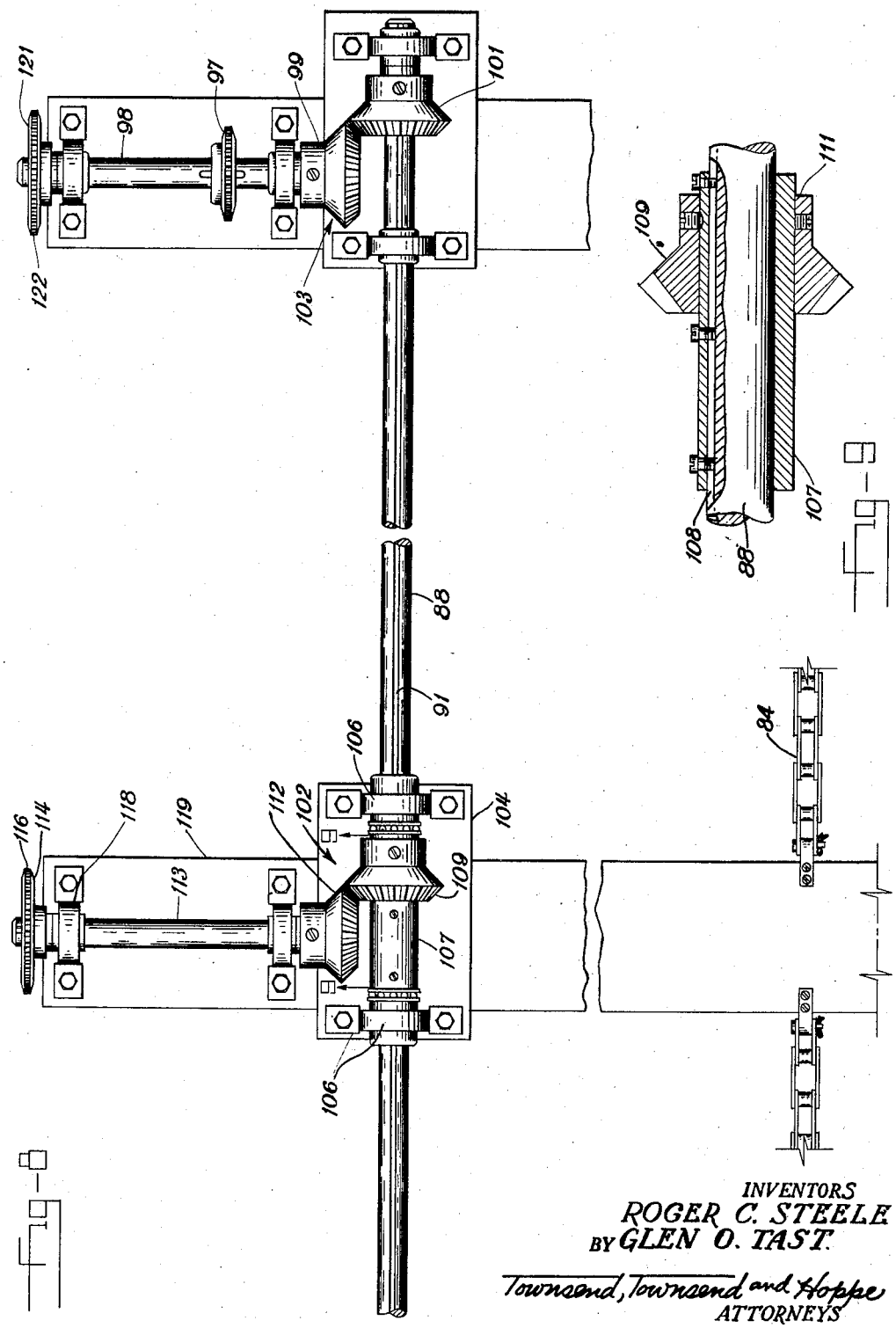

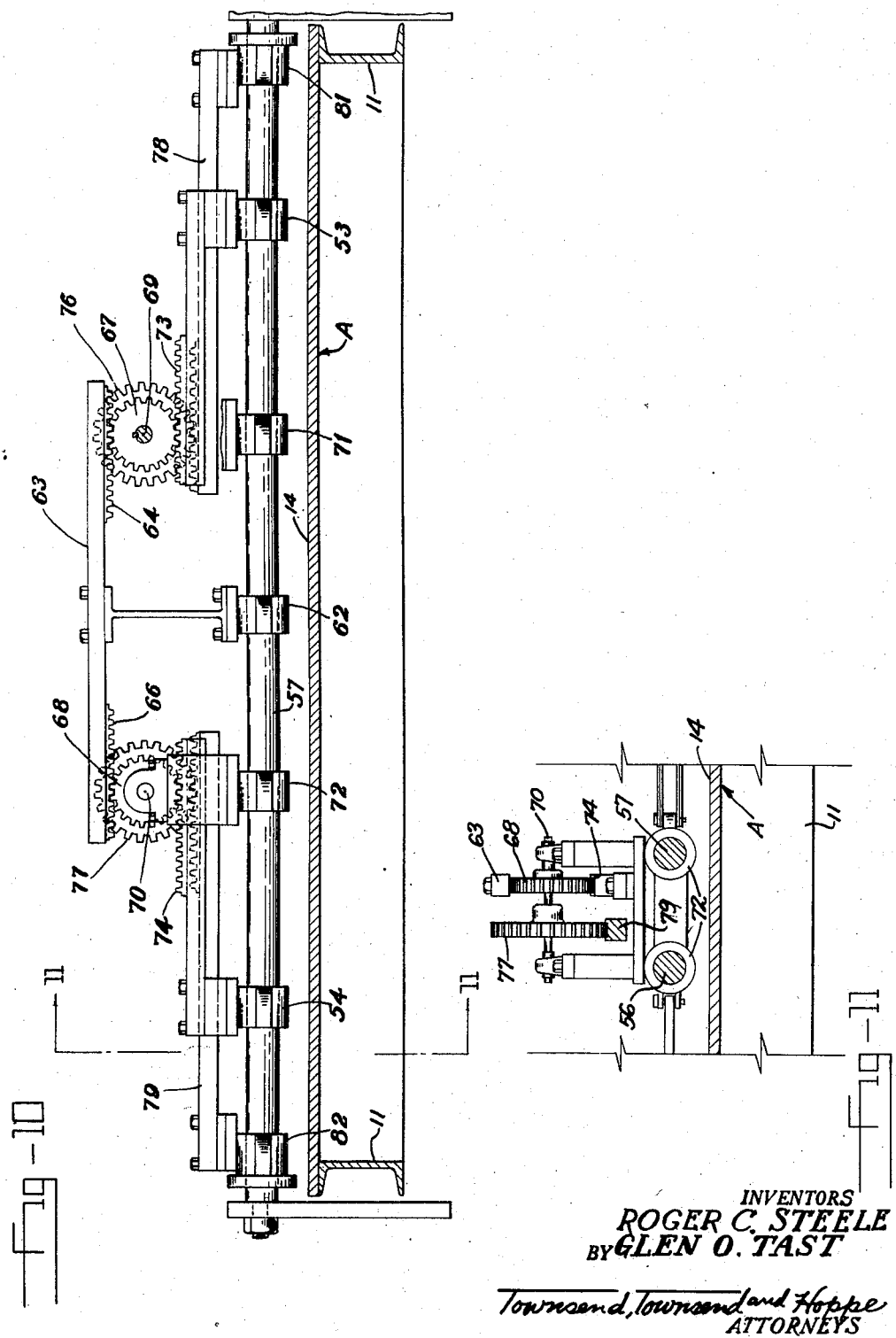

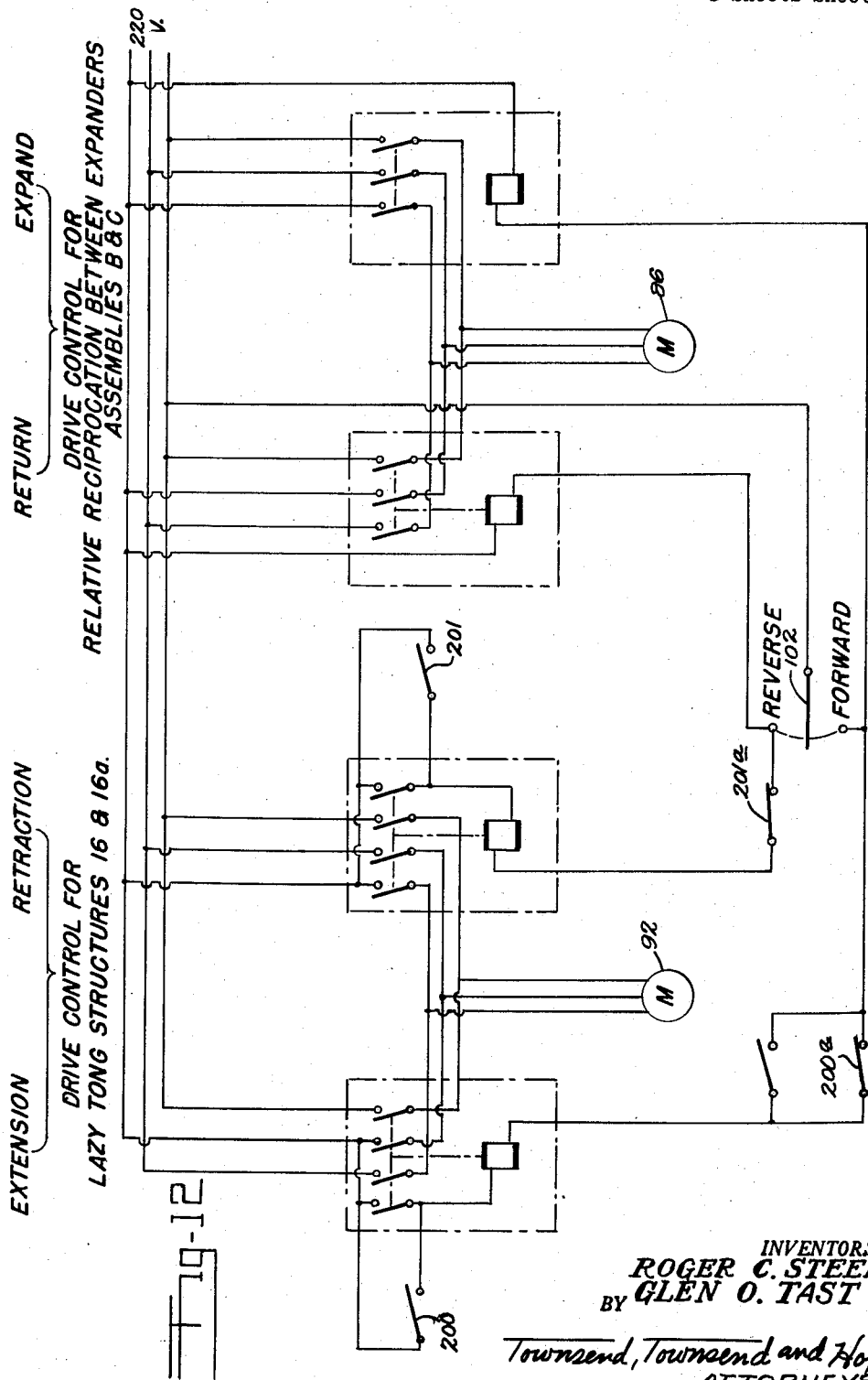

United States Patent Office 2,870,693
Patented Jan. 27, 1959

2,870,693

PULLING MEANS FOR EXPANDING HONEYCOMB

Roger C. Steele, Berkeley, and Glen O. Tast, Oakland, Calif., assignors to Hexcel Products Inc., Oakland, Calif., a corporation of California Application July 26, 1955, Serial No. 524,462

6 Claims. (Cl. 93—1)

This invention relates to an improved machine for expanding unexpanded sections of honeycomb.

The principal object of the present invention is to provide a machine for rapidly, uniformly and economically expanding sections of unexpanded honeycomb. Although it is contemplated that the invention will have particular utility in expanding metal foil honeycomb (such as aluminum foil honeycomb), it is understood that the present invention is not limited in its scope to use with any particular type or types of honeycomb material.

The particular embodiment of the invention which is illustrated in the drawings and which will be described hereinafter in greater detail comprises in conjunction with a primary frame and table structure first and second honeycomb engaging expander assemblies, one of which is mounted for reciprocable movement longitudinally of the table structure relatively toward and away from the other expanded assembly. Each expander assembly comprises a plurality of vertically reciprocable honeycomb engaging pins which are mounted on the inner pivoted elbow joints of a lazy tong structure extending transversely of the table structure. Driving means connected with the lazy tongs and operated in coordinated relation to the relative reciprocal movement of the expander assemblies is provided to cause the lazy tongs to contract corresponding to the narrowing of the honeycomb section in the direction of its width as said honeycomb is expanded endwise in the direction of its length. In this connection, it is well known that honeycomb is characterized by the tendency of the individual honeycomb webs to purse inwardly and result in an over-all widthwise narrowing of the honeycomb as said honeycomb is expanded endwise. In operation, a section of unexpanded honeycomb is positioned between the expander assemblies with its opposite end webs adjacent said assemblies. By means of a hydraulic press, the honeycomb engaging pins can be simultaneously forcefully driven into engagement with the unexpanded honeycomb cells adjacent the end webs of said honeycomb. Thereupon, one expander assembly is reciprocably driven lengthwise of the table away from the other expander assembly which asserts an endwise expansion pull of the honeycomb section. After the moving expander assembly has moved a predetermined distance away from its counterpart assembly, the aforementioned driving means is actuated for causing contraction of the pin-carrying lazy tong structures to compensate for the widthwise narrowing of the honeycomb section which, as above explained, occurs upon endwise expansion of said section. When the expander assemblies have moved a sufficient distance apart to cause full expansion of the honeycomb section, the honeycomb engaging pins of the expander assemblies are vertically reciprocated out of engagement with the honeycomb cells whereby the expanded section of honeycomb is removed from the table structure, and expanding operations with respect to another unexpanded honeycomb section can be commenced anew.

A more specific object, therefore, of the present invention is to provide a machine of the character briefly mentioned above incorporating novel honeycomb engaging pin members and which, in turn, are carried by lazy tong or equivalent structures contractable proportionately to the narrowing of the honeycomb section engaged by the pins as the latter is expanded endwise.

Numerous other objects and advantages of the present invention will become apparent upon reading the following specification and referring to the accompanying drawings in which similar characters of reference represent corresponding parts in each of the several views.

In the drawings:

Fig. 1 is a view in side elevation of a machine embodying the invention.

Fig. 2 is a top plan view of the machine with the press assembly removed and showing relative positions of the expander assemblies at the commencement of an expansion stroke.

Fig. 3 is the same as Fig. 2 and showing the position of the expander assemblies near the conclusion of an expansion stroke.

Fig. 4 is a transverse sectional view of the machine taken substantially along line 4—4 of Fig. 1.

Fig. 5 is an enlarged, fragmentary, sectional view taken substantially on line 5—5 of Fig. 4.

Fig. 6 is an enlarged, fragmentary view of a honeycomb pin engaging and retraction assembly and showing portions thereof broken away in section.

Fig. 7 is a view taken substantially in the plane of line 7—7 of Fig. 6.

Fig. 8 is an enlarged, fragmentary, bottom plan view of the expander assembly drive mechanism.

Fig. 9 is an enlarged, fragmentary, sectional view taken substantially on line 9—9 of Fig. 8.

Fig. 10 is an enlarged, fragmentary, and elevational view of the lazy tong structure pinion and rack drive showing the relative positions of the parts as they appear in Fig. 2.

Fig. 11 is a fragmentary, sectional view taken substantially on line 11—11 of Fig. 10.

Fig. 12 is a wiring diagram of an electrical circuit.

Referring now more particularly to the drawings, the embodiment of the machine therein disclosed is shown as comprising, generally, a primary frame and table structure A, first and second expander assemblies B and C, drive mechanisms D and D' and a press assembly E.

The primary frame and table structure A comprises, more specifically, legs 10 which support a horizontal table frame comprising I beams 11, the flanges 12 and webs 13 of which establish inwardly projecting channel recesses extending along and below opposite sides of the table surface 14. The I beam channels function to provide roller guideways for supporting the expander assembly B as will more fully hereinafter be described.

The expander assembly B, which will now be described in detail, is mounted for reciprocable movement lengthwise of the table structure relatively toward and away from expander assembly C. In describing and designating the component elements that comprise expander assembly B, it is pointed out that expander assembly C comprises for the most part equivalent or corresponding components. Accordingly, the component elements comprising expander assembly C are designated in the drawings by the same reference numerals as equivalent or corresponding elements comprising assembly B, but are suffixed by the letter "a" to distinguish them in the drawings. Assembly B comprises a lazy tong structure, indicated generally at 16, incorporating an upper and lower vertically spaced series of pivotally connected crossed levers 17. Honeycomb engaging members comprising vertically reciprocable pins 18 are carried by the inner pivoted elbow joints of the lazy tong structure 16.

More specifically, pins 18 are mounted on a pin retainer and extractor mechanism consisting of a bar 19 formed with an elongated slot 21 of sufficient size to slidably receive the shanks of the pins 18. Said pins are provided with enlarged heads 22 of larger diameter than slots 21 whereby said pins are free to move slidably within the slots relatively toward and away from one another and with the heads of the pins functioning to prevent them from dropping through the slotted bar. The pin retaining and retracting bar 19 extends transversely of table surface 14 and is mounted for vertical reciprocable movement with respect thereto by means of guide rods 23 slidably received with guide wells 24 formed in the body of the expander carriage frame plates 26. Guide bar 19 may be reciprocated upwardly and downwardly by means of a crank 27 operated pinion 28 which is also mounted on frame plate 26 and which is engageable with a rack 29 secured to bar 19 (see Figs. 6 and 7).

The shanks of the pins 18 extend slidably through spaced upper and lower guide plates 31 and 32 which, in turn, are supported pivotally by the inner lazy tong elbow joint pivot pins 33. Said guide plates 31 and 32 are maintained in vertically spaced relation by spacers 34.

It is observed that the pinion and rack assembly 27–29 can be operated to raise the pointed ends of the pins from a lowered position, whereat the pointed ends of the pins are received within the apertured bottom guide plates 32, to a raised position, whereas the pointed ends of the pins are disposed above the underside of the top guide plates 31.

Each lower plate 32 is also provided with an outwardly extending honeycomb support arm 36 for supporting honeycomb sections (such as indicated at 37) to be expanded in a manner that will also be more fully explained hereinafter.

As above noted, honeycomb is characterized by the tendency to narrow in the direction of its width as it is expanded in the direction of its length. Accordingly, when expander assembly B is reciprocated lengthwise of the table away from expander assembly C and in such manner to cause expansion of a honeycomb section 37 engaged by said assemblies B and C, it is important that the honeycomb engaging pins 18 and 18ª carried by the lazy tong structures 17 and 17ª of the two assemblies be driven relatively toward one another and closer together corresponding to the amount of narrowing that the expanding honeycomb section undergoes. In the accomplishment of this end, we provide drive mechanisms indicated generally at 38 and 38ª, respectively, for causing the lazy tong structures to contract inwardly in ratio and in timed relation to the speed and extent of reciprocal movement lengthwise of the table structure of expander assembly B. Thus, for example, the drive assembly 38 for driving the lazy tong structure 16 of assembly B comprises the drive shaft 39 extending transversely of the table structure and rotatably supported at its opposite ends in suitable bearings provided in carriage frame plates 26. A guide rod 41 extending parallel to shaft 39 is also supported at its opposite ends to said frame plates 26. The drive shaft 39 is further rotatably supported intermediate its ends by three spacer members such as indicated at 42. Shaft 39 is formed with right and left hand threaded areas indicated at 43 and 44, respectively, which said areas are located toward opposite ends of the shaft 39. Each threaded area is adapted to threadedly receive an appropriately and complementally interiorly threaded collar or bearing such as indicated at 46 and 47, respectively. Each of the threaded collars is formed with an extended guide bearing such as indicated at 48 and 49, respectively, slidably mounted upon guide rod 41. It is appreciated that rotatable movement of guide shaft 39 will cause movement of threaded collars 46 and 47 relatively toward or away from one another depending upon the direction at which said shaft 39 is rotated.

Each threaded collar 46 and 47 is connected by a respectively associated link 51 and 52 to sleeve bearings or follower arms 53 and 54, respectively, which are mounted on parallel guide rods 56 and 57. The follower arms 53—54 are connected at their inner ends as at 58 and 59, respectively, to an associated pivoted elbow joint of lazy tong structure 16. It is observed that the points of connection 58 and 59 between the follower arms and the lazy tong structure are located approximately one-sixth the length of the lazy tong structure inwardly from opposite ends of said lazy tong structure. Moreover, the follower arms 53 and 54 are also connected through pinion and rack assembly to additional spaced sleeve bearings mounted on guide arms 56 and 57 and which said additional sleeve bearings are connected to the lazy tong structure 16 at intermediate spaced points throughout the length of said lazy tong structure.

More specifically, the center or midpoint of lazy tong structure 16 is connected as at 61 to a stationary center arm 62 whereby the centrally located crossed levers of the lazy tong structure are held immovable against lateral or sidewise displacement with reference to the table structure. Said center arm 62, in turn, supports an upwardly and laterally projecting rack 63 adjacent the opposite ends of which are provided gear teeth 64 and 66 engageable by pinions 67 and 68 mounted on pinion shafts 69 and 70 which, in turn, are journaled to sleeve bearings 71 and 72—these latter bearings being slidably mounted on guide rods 56 and 57 between center arms 62 and follower arms 53 and 54. Pinions 67 and 68 are also engageable in racks 73 and 74 which are rigidly mounted to follower arms 53 and 54.

Keyed on shafts 69 and 70 are pinions 76 and 77 of substantially larger diameter than pinions 67 and 68. The larger pinions 76 and 77 are engaged with racks 78 and 79 which are rigidly connected to outer sleeve bearings 81 and 82, respectively, also mounted on said guide rods 56 and 57. It is further observed that sleeve bearings 71—72 and 81—82 are each connected to the lazy tong structure 16 at spaced points throughout the length of said structure.

The operation of drive assembly 38 as thus far described is briefly as follows:

When drive shaft 39 is rotated (by means to be later described) in a direction appropriate to threadedly drive collars 46—47 relatively toward one another, follower arms 53 and 54 through their link connections 51 and 52 with the collars are also caused to slidably move along guide rods 56 and 57 toward one another. Closing movement of guide arms 53 and 54 through their rack 73 and 74 engagement with pinions 67 and 68 cause rotation of pinion shafts 69 and 70 and further causes relatively inward closing movement of sleeve bearings 71 and 72. Rotation of shafts 69 and 70 also imparts rotation to the larger pinions 76 and 77 which, through their rack connection 78—79 with outer sleeve bearings 81 and 82, will cause said bearings 81 and 82 to move or close toward one another along guide rods 56 and 57.

In order to obtain uniform expansion of the honeycomb, it is desirable that all of the honeycomb engaging pins 18 and 18ª carried by the lazy tong structure 16 and 16ª move simultaneously and in proper timed relation to one another. In particular, the honeycomb engaging pins carried by the outer end extremities of the lazy tong structures 16 and 16ª must move inwardly a greater distance and more rapidly than the honeycomb engaging pins located more toward the central portion of lazy tong structure. To accomplish this end, the proper relative movement between follower arms 53—53ª and 54—54ª to inner sleeve bearings 71—71ª and 72—72ª and outer sleeve bearings 81—81ª and 82—82ª is obtained through regulation of gear ratio of the pinion and rack components above described. More specifically, the diameter of pinions 67—67ª and 68—68ª through which reciprocal movement of sleeve bearings 71—71ª and 72—72ª is imparted is such that relative movement of said sleeve bearings along the guide rods 56 and 56ª is approximately half that of follower arms 53—53ª and 54—54ª. Moreover, the gear ratio of pinion and rack assemblies 76—78 (76ª—78ª) and 77—79 (77ª—79ª) is such that the relative movement of outer sleeve bearings 81—81ª and 82—82ª will be aproximately twice that of follower arms 53—53ª and 54—54ª.

Expander assembly B is mounted for relative reciprocal movement lengthwise of table structure A and relative to expander assembly B by roller bearings 83 rotatably journaled to the inside faces of carriage frame plates 26. As shown in Fig. 1, said roller bearings 83 fit within the channel recesses defined by I beams 11 of the table structure and with said rollers in bearing contact with flanges 12 of said I beams.

Driving power for reciprocating expander assembly B may be supplied through an endless chain drive 84 having its opposite ends connected to the lower part of expander assembly B. Chain 84 is driven from power supplied by a three phase, reversible, electric motor 86 connected to the chain through conventional reduction gear mechanism 87 and a sprocket 87ª in mesh engagement with the chain 84. Actuation of motor 86 may be accomplished through operation of a series of manual and contact switches, solenoid and other electrical apparatus indicated in the wiring diagram of Fig. 12. Some of the electrical components will be mentioned specifically hereinafter and with reference to their location on the expanding machine. At the moment it will suffice to remark that reversible motor 86 can be actuated and controlled to drive the expander assembly B longitudinally of table structure A relatively toward and away from expander assembly C. Additional drive means now to be described are provided to drive the lazy tong structure 16ª of expander assemblies B and C in timed relation to reciprocal movement of expander assembly B lengthwise of the table structure.

Rotatably supported beneath table structure and extending substantially the full length thereof is a drive shaft 88 mounted in suitable bearings 89. Shaft 88 is formed with a keyway 91 extending substantially the full length of the shaft. Driving power for shaft 88 is supplied through motor 92 connected to the shaft via reduction gear assembly 93 and a chain drive 94. Said assembly 94 includes a drive sprocket 96, a driven sprocket 97, and a shaft 98 to which is affixed a bevel gear 99 in mesh engagement with a complementary bevel gear 101 keyed to drive shaft 88.

Power take-off units indicate generally at 102 and 103 respectively associated with expander assemblies B and C are provided to transmit power from shaft 88 to the lazy tong structures 16 and 16ª of said expander assemblies B and C. More specifically, the power take-off unit 102 comprises a bearing block 104 slidably mounted on drive shaft 88 by bearings 106. Mounted on shaft 88 between bearings 106 is a sleeve bushing 107 on which is keyed or set-screwed bevel gear 109. Bushing 107 is provided with an inwardly projecting key 108 shaped and proportioned to slidably be received within keyway 91 formed in shaft 88.

It is seen that bearing block 104 carrying bearings 106, sleeve 107 and bevel gear 109 is thus mounted on shaft 88 for longitudinal movement relative thereto and with the sleeve and bevel gear in key engagement with the shaft whereby rotation of the latter will cause corresponding rotation of the sleeve supporting bevel gear 109. Bevel gear 109, in turn, is connected to drive shaft 39 of expander assembly B via a gear and sprocket chain coupling comprising bevel gear 112 in mesh engagement with bevel gear 109, shaft 113, sprocket 114, chain 116 and driven sprocket 117—the latter element being keyed or otherwise secured to the outer end of drive shaft 39. It is observed that shaft 113 which carries bevel gear 112 and sprocket 116 is rotatably journaled by bearings 118 to a supporting plate 119 rigidly connected to bearing block 104.

Lazy tong structure 16ª is also driven off of shaft 88 and at the same relative speed and movement as lazy tong structure 16 via power take-off unit 103 and chain drive assembly comprising a driving sprocket 121 mounted on shaft 98 and linked via chain 122 to a driven sprocket 123 mounted on the end of shaft 39ª. In view of the fact that bevel gears 99 and 101 and sprocket wheels 121 and 123 associated with expander assembly C are of the same size and diameter as bevel gears 109—112 and sprocket wheels 114—117 associated with expander assembly B, it is apparent that the threaded drive shafts 39 and 39ª of the said assemblies and respectively associated with lazy tong structures 16 and 16ª will be driven simultaneously and at the same rotational speed with reference to rotation of shaft 88.

It is pointed out that the ratio that a given section of honeycomb will pursably narrow in the direction of its width as it is expanded in the direction of its length will depend largely upon its nominal cell size. Accordingly, it is appreciated that the driving speed of lazy tong drive assemblies 38 and 38ª in relation to the speed of expansion of the honeycomb can be varied according to the ratio of widthwise contraction to lengthwise expansion of any given honeycomb section to be expanded by the present machine.

In order to establish and maintain properly timed relative movements between contraction of the lazy tong structures in relation to a reciprocal relative movement between said structures lengthwise of the table, an electrical system may be provided such as disclosed schematically in the wiring diagram of Fig. 12. It is appreciated that the wiring circuit per se does not comprise a part of the present invention, it being realized that numerous equivalent systems could be substituted to accomplish substantially the same results of timing and synchronization of movements between the various parts. It may suffice to remark that on the underside of the I beam table frame structure A may be mounted a series of contact micropoint switches, indicated at 200ª, 201, and 201ª, respectively (see Fig. 1). Each of these switches is adapted to be engaged and successively actuated upon movement of carriage 26 during the latter's expansion and return strokes lengthwise of the table structure A. A similar contact micro-switch 200 is shown positioned adjacent guide rod 41ª of drive assembly 38ª and is adapted to be contacted and actuated by movement of guide sleeve 48ª when the latter nears the end of its outward travel corresponding to movement of collar 46ª along threads 43ª.

It will be apparent to those skilled in the art that the series of switches above identified in addition to the other switches and the electrical circuit disclosed in Fig. 12 may be utilized to operate the moving parts of the machine in proper synchronized and electrically interlocked relation relative to one another.

The press assembly heretofore indicated generally at E comprises a conventional air piston 124 mounted for vertical reciprocal movement within cylinder 126. The piston and cylinder assembly is supported above table structure A by a frame structure 127. Connected to piston 124 and extending outwardly from cylinder casing 126 is a connecting rod 128 carrying a platen 129. The platen 129 is of sufficient area to extend substantially the full width of the table structure and to overlie the enlarged heads 22 of the honeycomb engaging pins 18 carried by both the expander assemblies B and C when said assemblies are located relatively adjacent one another. In brief, the function of the air piston driven platen 129 is to simultaneously forcefully drive all of the pins 18 and 18ª into engagement within the unexpanded cell openings of a section of honeycomb 37 positioned on the honeycomb supporting arms 36 of the expander assemblies prior to initiation of an expansion stroke or cycle of the machine. To stabilize vertical reciprocal movement of platen 129 and to insure simultaneous and uniform application of pressure to all of the pins 18 and 18ª, opposite ends of the platen may be provided with outwardly extending guide arms 130 on the outer ends of which are mounted shoes 131 slidably disposed within vertical channel guideways 132.

Although the present invention has been described in some detail by way of illustration and example for purposes of clarity of understanding, it is understood that certain changes and modifications may be made within the spirit of the invention as limited only by the scope of the claims appended hereto.

We claim:

1. Means for expanding honeycomb characterized by its tendency to narrow in the direction of its width in determinable ratio to its lengthwise expansion, comprising: first and second assemblies for engaging opposite end areas of an unexpanded honeycomb section; means for forcefully reciprocating said assemblies away from one another to exert an expansion force on a section of honeycomb engaged by said assemblies; each assembly comprising a lazy tong structure defining parallel inner and outer rows of pivoted elbow joints; said inner elbow joints individually supporting a plurality of honeycomb engaging members in spaced relation and for movement relatively closer and further away from one another upon relative retraction and extension of said lazy tong structure; and driving means operable to retract said lazy tong structure and cause said members carried thereby to move relatively closer together in synchronized relation to the relative narrowing of the honeycomb section during reciprocable movement of said assemblies away from one another causing consequent expansion of said honeycomb section; said driving means comprising synchronized screw drive means connected to the outer rows of pivoted elbow joints of each lazy tong structure.

2. Means for expanding honeycomb characterized by a tendency to narrow in the direction of its width in determinable ratio to its lengthwise expansion comprising: an expansion table surface; first and second honeycomb engaging assemblies extending transversely of and located above said table surface adapted to engage opposite end areas of an unexpanded honeycomb section positioned on said table surface; means for forcefully reciprocating said assemblies away from one another lengthwise of said table surface to exert an expansion force on a section of honeycomb engaged by said assemblies; each assembly comprising a lazy tong structure defining inner and outer parallel rows of pivoted elbow joints extending transversely of said table surface; the inner pivoted elbow joints individually supporting a plurality of honeycomb engaging pins each adapted to engage a cell opening of said section of unexpanded honeycomb adjacent an end web of said section; driving means associated with the outer row of elbow joints of each lazy tong structure for forcefully contracting each structure to cause said honeycomb engaging pins carried thereby to move relatively closer together in a synchronized relation to the relative narrowing of the honeycomb section during reciprocable movement of said assemblies away from one another causing consequent expansion of said honeycomb section; said driving means comprising a drive shaft extending transversely of said table surface and formed with a right-hand threaded portion adjacent one end and a left-hand threaded portion adjacent its opposite end; first and second interiorly threaded collars mounted on the threaded portions of said shaft movable axially of said shaft corresponding to the direction of rotation of said shaft; means for rotating said shaft in a direction to cause said threaded collars to move relatively toward one another along said shaft; and coupling means linking said first collar with an outer elbow joint adjacent the first end of an associated lazy tong structure, and linking said second collar with an outer elbow joint adjacent the second end of said structure.

3. Means for expanding honeycomb characterized by a tendency to narrow in the direction of its width in determinable ratio to its lengthwise expansion comprising: an expansion table surface; first and second honeycomb engaging assemblies extending transversely of and located above said table surface adapted to engage opposite end areas of an unexpanded honeycomb section positioned on said table surface; means for forcefully reciprocating said assemblies away from one another lengthwise of said table surface to exert an expansion force on a section of honeycomb engaged by said assemblies; each assembly comprising a lazy tong structure defining inner and outer parallel rows of pivoted elbow joints extending transversely of said table surface; the inner pivoted elbow joints individually supporting a plurality of honeycomb engaging pins each adapted to engage a cell opening of said section of unexpanded honeycomb adjacent an end web of said section; driving means associated with the outer row of elbow joints of each lazy tong structure for forcefully contracting each structure to cause said honeycomb engaging pins carried thereby to move relatively closer together in a synchronized relation to the relative narrowing of the honeycomb section during reciprocable movement of said assemblies away from one another causing consequent expansion of said honeycomb section; each said honeycomb engaging pin vertically reciprocably mounted to a respectively associated inner elbow joint of an associated lazy tong structure; means commonly associated with all of the pins of each lazy tong structure for forcefully reciprocating said pins to their down positions to cause forceful penetration and engagement of said pins into the cell areas of the honeycomb section to be expanded; and means to raise all said pins to free the pins from engagement with the cell areas of the expanded honeycomb section.

4. Means for expanding honeycomb characterized by a tendency to narrow in the direction of its width in determinable ratio to its lengthwise expansion comprising: an expansion table surface; first and second honeycomb engaging assemblies extending transversely of and located above said table surface adapted to engage opposite end areas of an unexpanded honeycomb section positioned on said table surface; means for forcefully reciprocating said assemblies away from one another lengthwise of said table surface to exert an expansion force on a section of honeycomb engaged by said assemblies; each assembly comprising a lazy tong structure defining inner and outer parallel rows of pivoted elbow joints extending transversely of said table surface; the inner pivoted elbow joints individually supporting a plurality of honeycomb engaging pins each adapted to engage a cell opening of said section of unexpanded honeycomb adjacent an end web of said section; driving means associated with the outer row of elbow joints of each lazy tong structure for forcefully contracting each structure to cause said honeycomb engaging pins carried thereby to move relatively closer together in a synchronized relation to the relative narrowing of the honeycomb section during reciprocable movement of said assemblies away from one another causing consequent expansion of said honeycomb section; first and second means to respectively reciprocate said pins relatively toward and away from said table surface into and out of relative engagement with said honeycomb.

5. In a honeycomb expanding machine of the type characterized as including first and second frame assemblies movable relatively toward and away from one another over an expanding table surface; means carried by each assembly for releasably penetrably engaging opposite end cell areas of a honeycomb section to be expanded comprising: first and second honeycomb pin engaging assemblies each carried respectively by said first and second frame assemblies; each pin assembly comprising a plurality of honeycomb engaging pins each adapted to engage a cell opening of said honeycomb section adjacent an end of said section; the pins of each said assembly mounted for movement from a relatively spread apart starting position to a relatively closer together subsequent position corresponding to the narrowing of a honeycomb section adapted to be engaged by said pins during expansion thereof; means vertically reciprocally mounting the pins of each assembly; means commonly associated with all of the pins to forcefully reciprocate said pins downwardly to cause penetration and engagement of said pins into the cell area of the honeycomb section; and means commonly associated with the pins of each respective pin assembly to reciprocate vertically upwardly all of said pins within said assembly out of engagement from the cell area of said honeycomb section.

6. Means for expanding honeycomb characterized by the tendency to narrow in the direction of its width in determinable ratio to its lengthwise expansion, comprising: first and second assemblies for engaging opposite end areas of unexpanded honeycomb sections; means for forcefully reciprocating said assemblies away from one another to exert an expansion force on a section of honeycomb engaged by said assemblies; each assembly comprising a lazy tong structure defining first and second rows of pivoted elbow joints, each joint of said first row individually supporting one of a plurality of spaced honeycomb engaging members; the centermost elbow joint of each lazy tong structure being mounted at a fixed position on said assembly; first drive means connected to two joints of said second row of each structure adjacent opposite ends thereof and operable to forcefully drive said joints toward one another and toward said fixed centermost joint; second drive means connected to two joints of said second row of each structure at points intermediate opposite ends of each structure and the said fixed centermost joint thereof and operable to drive said joints toward one another and toward said centermost joint; and means synchronizing the driving speeds of said first and second driving means for forcefully driving the joints to which said first drive means are connected toward the fixed centermost joint at a substantially higher rate of speed than the rate of speed at which the intermediate joints are driven toward the centermost joint by said second driving means.

References Cited in the file of this patent

UNITED STATES PATENTS

| | | |
|---|---|---|
| 827,441 | Harding | July 31, 1906 |
| 980,638 | Hill | Jan. 3, 1911 |
| 2,400,787 | Taylor | May 21, 1946 |
| 2,756,496 | Holland | July 31, 1956 |

FOREIGN PATENTS

| | | |
|---|---|---|
| 45,610 | Germany | Mar. 22, 1889 |